United States Patent [19]
Ferris et al.

[11] 3,972,491
[45] Aug. 3, 1976

[54] TWO-POSITION HELICOPTER MAIN ROTOR

[75] Inventors: Donald Leroy Ferris, Newtown; Robert Charles Rybicki, Trumbull, both of Conn.

[73] Assignee: United Technologies Corporation, Hartford, Conn.

[22] Filed: July 14, 1975

[21] Appl. No.: 595,951

[52] U.S. Cl. .............................. 244/17.27; 416/142
[51] Int. Cl.² ......................................... B64C 27/06
[58] Field of Search .................................. 244/6–8, 244/17.11, 17.27; 415/DIG. 3; 416/142, 244, 146, 147, 149, 150

[56] References Cited
UNITED STATES PATENTS

| | | | |
|---|---|---|---|
| 1,672,216 | 6/1928 | Hollander | 415/DIG. 3 |
| 1,928,560 | 9/1933 | Davis | 244/8 |
| 2,464,285 | 3/1949 | Andrews | 244/7 |
| 2,509,481 | 5/1950 | Crise | 416/142 |
| 2,749,059 | 6/1956 | Meyers et al. | 244/7 R |
| 2,899,222 | 8/1959 | Ross | 416/244 |
| 3,912,199 | 10/1975 | Seibel et al. | 416/142 |

*Primary Examiner*—Trygve M. Blix
*Assistant Examiner*—Galen L. Barefoot
*Attorney, Agent, or Firm*—Vernon F. Hauschild

[57] ABSTRACT

A helicopter main rotor which can be supported in two positions of elevation above the fuselage, and apparatus and method for moving the helicopter rotor with blades attached from a first elevated position above the fuselage wherein the rotor is supported from an extension shaft projecting from a first shaft to a second elevated position above the fuselage wherein the rotor is supported from the first shaft.

70 Claims, 14 Drawing Figures

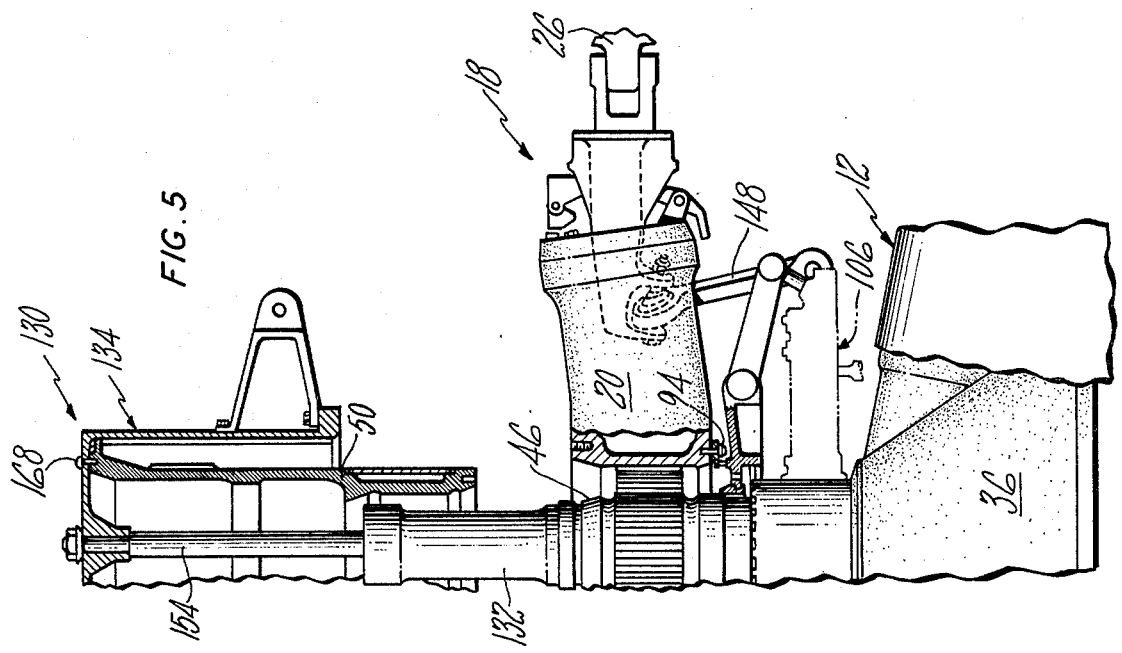
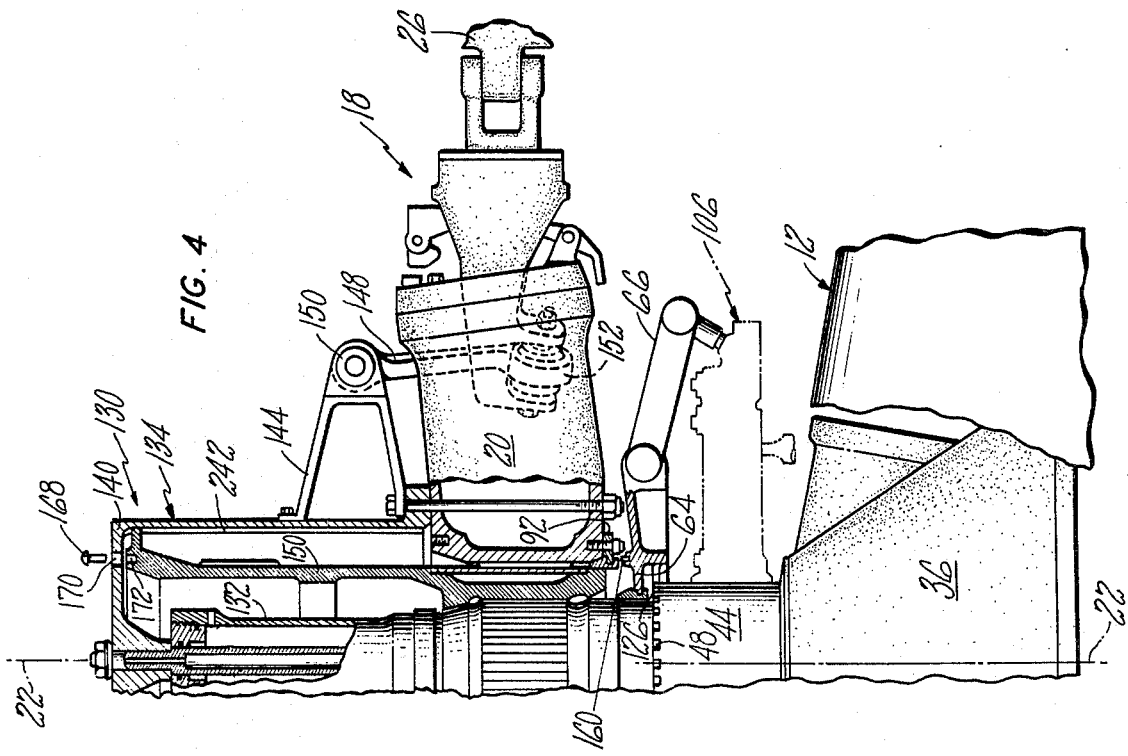

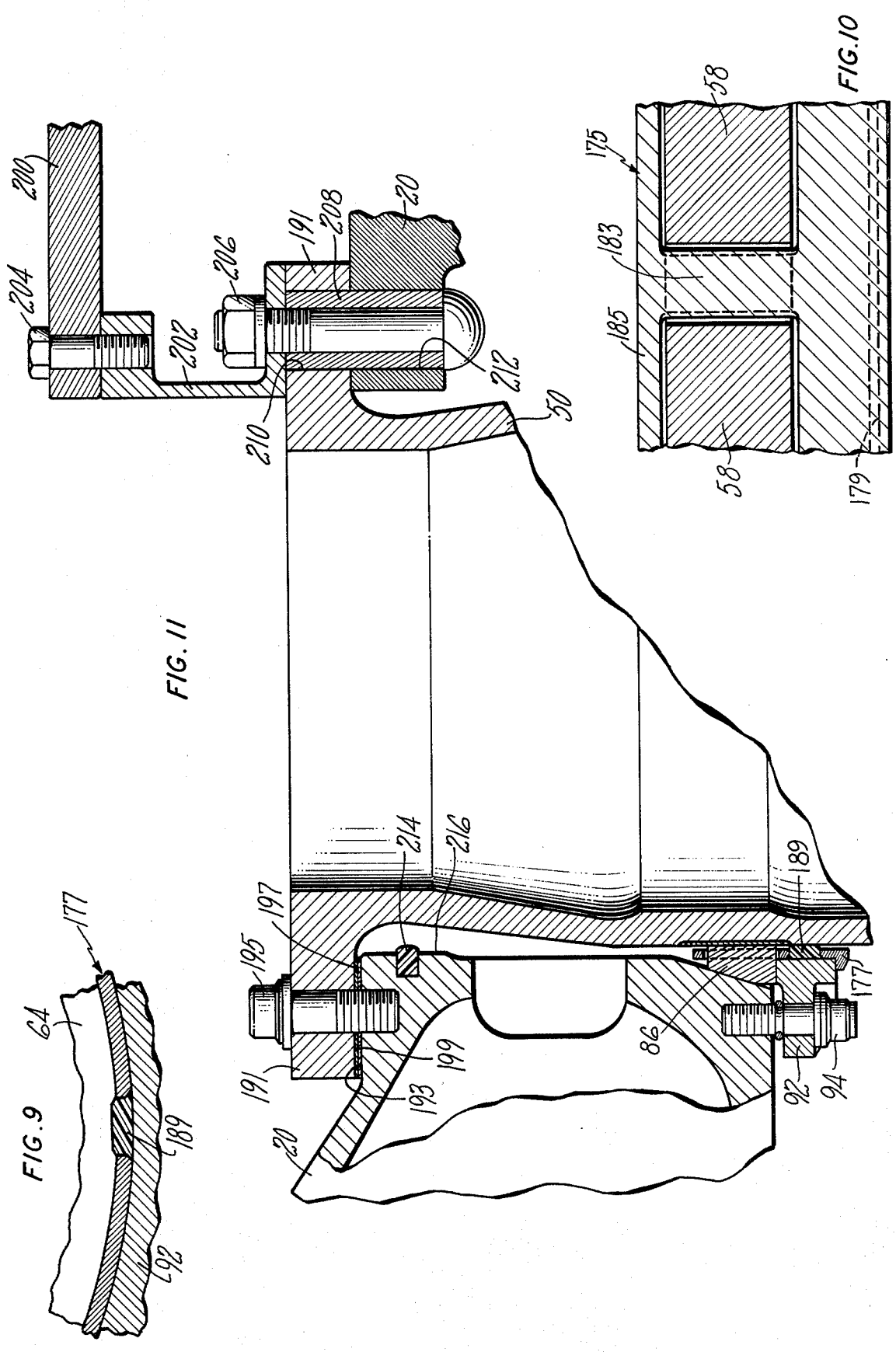

TWO-POSITION HELICOPTER MAIN ROTOR

BACKGROUND OF THE INVENTION

1. Field of the Invention

This invention relates to helicopter rotors and more particularly to helicopter rotors which are retractable so that the helicopter may be flown with the main lift rotor positioned a sufficient distance above the helicopter fuselage to avoid high air turbulence therebetween in forward flight, which turbulence would add to the helicopter drag and reduce its forward speed and reduce the vibration levels of the aircraft, and which can be retracted to a position closer to the fuselage for transportation of the helicopter in another vehicle.

2. Description of the Prior Art

In the helicopter field, there are the requirements that the main lift rotor be positioned a sufficient distance above the helicopter fuselage in flight so that coaction between the two does not establish vibrations and drag and, also, that the helicopter rotor can be retracted and secured in a position close to the fuselage when the helicopter is to be transported in another vehicle, such as a larger aircraft, an aircraft carrier, or a land vehicle.

Retractable rotors are known, principally in the converti-plane art wherein the entire rotor and its drive mechanism, such as the transmission and drive shafts, are retractable and extendable with respect to the fuselage. Experience has shown that such mechanisms are complicated in nature, heavy in weight, and occupy large volumes of space both within and outside of the fuselage thus resulting in increased frontal area and reduced cargo or passenger capacity. Examples of such constructions are shown in U.S. Pat. No. 3,370,809. During the evolution of our invention, this approach was thoroughly analyzed and found unacceptable for the reasons stated above.

Other known constructions in the helicopter art permit retraction of the helicopter rotor but require that all blades be removed prior to retraction, and this was found to be unacceptable because of the time factor involved to prepare the helicopter for air or other transportation and thereafter for operational flight again.

SUMMARY OF THE INVENTION

A primary object of the present invention is to provide a helicopter main rotor which will be operational at a sufficient elevation above the fuselage to avoid vibrations and drag during flight and which can be retracted to a position of close proximity to the fuselage for transportability in a minimum time.

In accordance with the present invention, the helicopter rotor is retracted from its elevated flight position to its retracted stowed position with the rotor blades in place.

In accordance with the further aspect of the present invention, the rotor is retracted with its blades in place and fixedly connected to the hub to prevent relative motion therebetween due to wind loading during the retraction process, and with the hub guided by support mechanism to prevent rotation or windmilling of the rotor hub and blades during rotor retraction.

In accordance with a further aspect of the present invention, the retracted rotor is connected to the main transmission in the fuselage by mechanism which prevents rotation therebetween and which absorbs head moment loading during subsequent blade folding for transportability of the helicopter.

In accordance with a further feature of the invention, when the helicopter rotor is in its retracted position the blades are connected to their normal pitch change mechanism so as to permit pitch change variation as required during the blade folding operation or otherwise during the helicopter stowage procedure for transportation.

In accordance with a further feature of this invention, the helicopter rotor is supported for rotation about an axis of rotation from an extension shaft which is, in turn, supported from the main rotor drive shaft which projects from the helicopter fuselage. The extension shaft is removed from within the rotor hub when the helicopter rotor is in its retracted position.

It is still a further feature of this invention that the helicopter rotor is moved with blades attached between its two positions by mechanism which maintains full control over the position and rate of movement of the helicopter rotor and blades at all times during the movement thereof.

It is still a further feature of this invention that the helicopter can be flown with its rotor in the elevated position or in the retracted position.

In accordance with still a further aspect of the present invention, a tool is provided which will lower the helicopter rotor with blades attached from its elevated flight position to its retracted, transportable position, which will maintain the helicopter rotor under complete movement control throughout movement between the flight and transportable positions, and which will fix the position of the blades relative to the hub during movement so as to prevent blade pitch motion during transition to the transport position or during conversion back to the flight condition. The tool is also capable of removing the rotor extension shaft from the drive shaft.

It is still a further feature of this invention that this tool can be powered hydraulically, pneumatically, mechanically, electrically, or by any conventional prime mover.

It is still a further feature of this invention that this tool can be removed entirely from the aircraft when not in use to reduce aircraft weight.

BRIEF DESCRIPTION OF THE DRAWING

FIG. 4 is a partial showing of the helicopter rotor in its retracted, transportable position and with the tool still attached thereto.

FIG. 5 is a partial showing of the two position helicopter rotor in its retracted position and with the tool installed and having extracted the rotor extension shaft from the rotor drive shaft.

FIG. 9 is a view taken along line 9—9 of FIG. 7.

FIG. 10 is a view taken along line 10—10 of FIG. 7.

FIG. 11 is a showing of a modified arrangement for connecting the helicopter rotor to the extension shaft in its flight position.

DESCRIPTION OF THE PREFERRED EMBODIMENT

Figure 1:
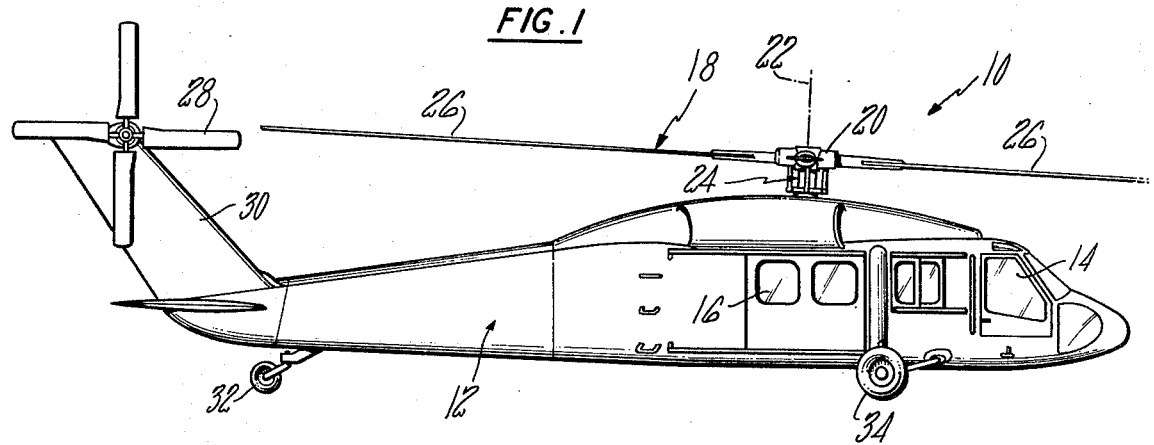
FIG. 1 is a side view of a helicopter utilizing the invention.

Referring to FIG. 1 we see helicopter 10 which comprises fuselage 12 including pilot compartment 14 and passenger or cargo compartment 16. Main lift rotor 18 is suspended in vertical elevation above fuselage 12 and consists of hub 20 supported for rotation about axis of rotation 22 by extension shaft assembly 24. A plurality of blades 26 extends substantially radially from hub 20 and rotates therewith about axis 22 to generate lift during helicopter flight operation. Tail rotor 28 is supported from helicopter tail or empennage 30 and performs its usual yaw control function. Landing gears 32 and 34 are adapted to support helicopter 10 for ground operation including taxiing, landing, and takeoff. Helicopter 10, which utilizes our invention, may be of the type of be used by the military or large commercial concerns wherein the helicopter must be capable of efficient and comfortable flight and must also be capable of being transportable in a minimum envelope aboard another vehicle, such as a large air transport, an aircraft carrier, or a large land vehicle. To fulfill these requirements, it is necessary that rotor 18 be of the two-position variety, that is, retractable, between an elevated position shown in FIG. 2 for flight operation and a transportable position (see FIG. 6) closer to fuselage 12 than that shown in the FIG. 2 position for transportability. It is also necessary that rotor 18 be so supported that it may be converted between its flight operating position of FIG. 2 and its transportable position of FIG. 6 in a manner to be described hereinafter in a minimum of time, with minimum risk of damage to parts or injury to personnel, and such that the blades 26 do not have to be removed from hub 20 during the transition. The rotor must be so movable from the extended, flight position to the retracted, transportable position and vice versa.

Figure 2:
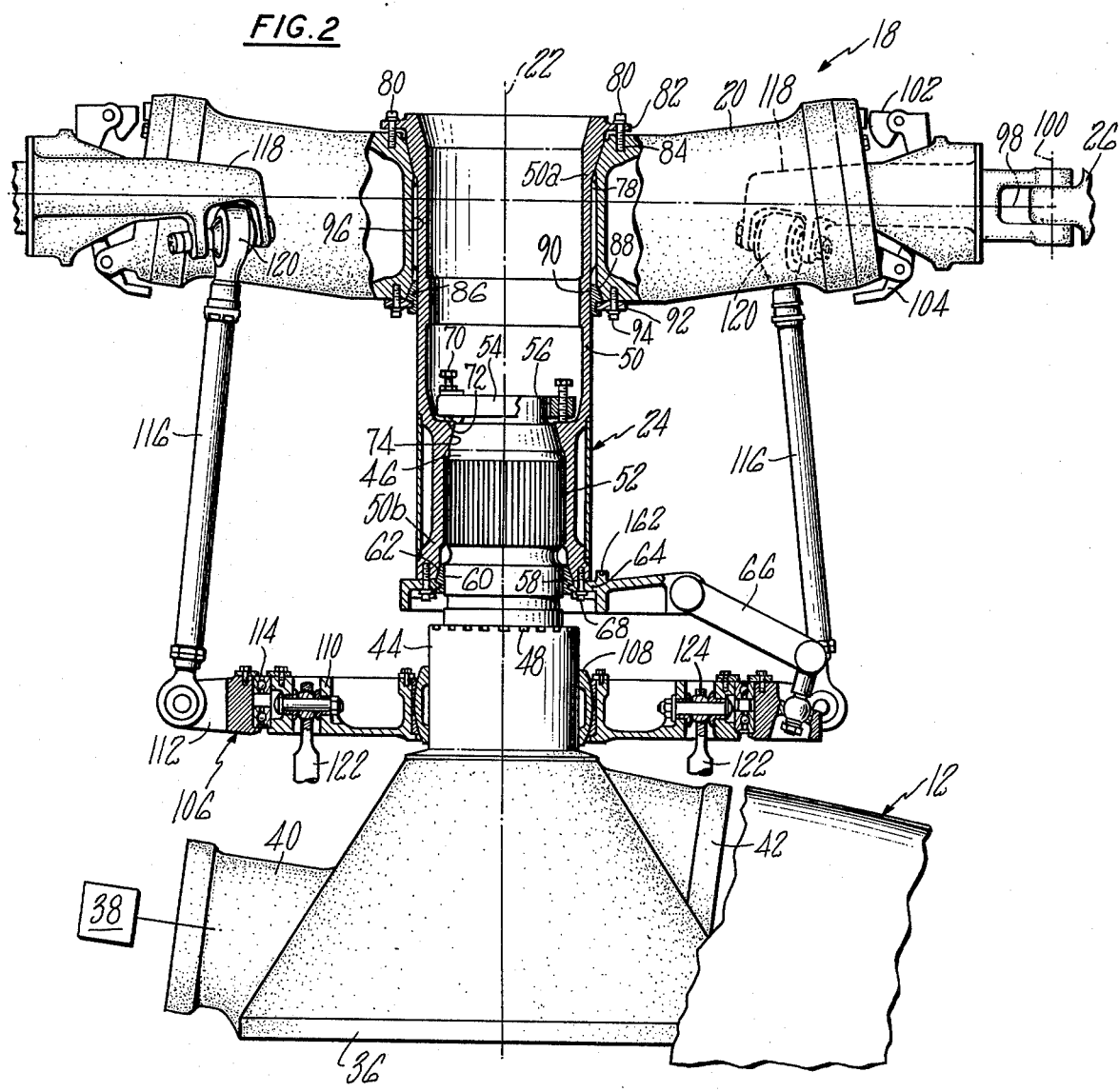
FIG. 2 is a side view, partially broken away for clarity, showing the two position rotor in its extended, operational flight position.

Referring to FIG. 2 we see helicopter main lift rotor 18 in greater particularity in its flight or elevated position. Rotor 18 is supported from fuselage 12, in part, by transmission housing 36 which is driven by conventional engine 38 through input drive 40 and which, in addition to driving main lift rotor 18, also drives tail rotor 28 through tail rotor take-off drive 42. Standpipe 44 extends vertically from and is connected to and supported by transmission housing 36 and provides centering means for conventional rotor swashplate spherical centering bearing used for tilting the swashplate for cyclic pitch variation of blades or vertical motion of the swashplate for collective pitch variation of the blades. Standpipe 44 has a plurality of grooves 48 positioned in the upper periphery thereof. Grooves 48 are preferably radially extending and equally spaced circumferentially about standpipe 44. Extension shaft 50 is supported from drive shaft 46 and extends vertically therefrom and is drivingly connected thereto by axially extending splines 52. Extension shaft 50 is attached to main drive shaft 46 by a combination of mast nut 54, which threadably engages drive shaft 46 at threaded connection 56, and split cone ring member 58, which is forced between the outer cylindrical surface 60 of shaft 46 and the conical or tapering surface 62 of extension shaft 50 by the pressure plate portion 64 of pressure plate and scissors mount combination 66 when pressure plate bolts 68 are screwed into tapped holes in the lower extremity of lower end 50b of extension shaft 50 to establish a preload condition. Mast nut 54 is preloaded by bolt members 70, which pass through threaded apertures in mast nut 54 and bear against the horizontal surface of bearing plate 72 which in turn bears against extension shaft 50. The action of preload bolt 70 serves to impose a preloading between drive shaft 46 and extension shaft 50 throughout the full circumferential dimension of tapered cooperating mating surface area 74. Due to this connection between drive shaft 46 and extension shaft 50, extension shaft 50 is supported vertically above and in more remote proximity to fuselage 12 than drive shaft 46 and for concentric rotation about axis 22. Shafts 46 and 50 are hollow shafts.

Helicopter rotor 18, and more particularly hub 20, is supported from extension shaft 50 upper end 50a through axial spline connection 78 and the action of preload bolt 80 which pass through holes in circumferential flange 82 of extension shaft 50 and are received in threaded apertures 84 in hub 20 upper side so as to serve to preload hub and extension shaft 54 throughout the full circumferential periphery of lift cone surface connection 86 between hub 20 and shaft extension 50. The lower side of hub 20 is connected to extension shaft 50 by split cone members 86 which are wedged in preloaded fashion between tapered surface 88 of hub 20 and outer cylindrical surface 90 of extension shaft 50 by the action of pressure plate 92 and preload bolt 94 in the manner previously described. In this fashion, drive shaft 46 is connected to extension shaft 50, and disk 20 is connected to extension shaft 50 by two axially spaced connecting means with a spherical connection therebetween to impart driving torque.

Figure 6:
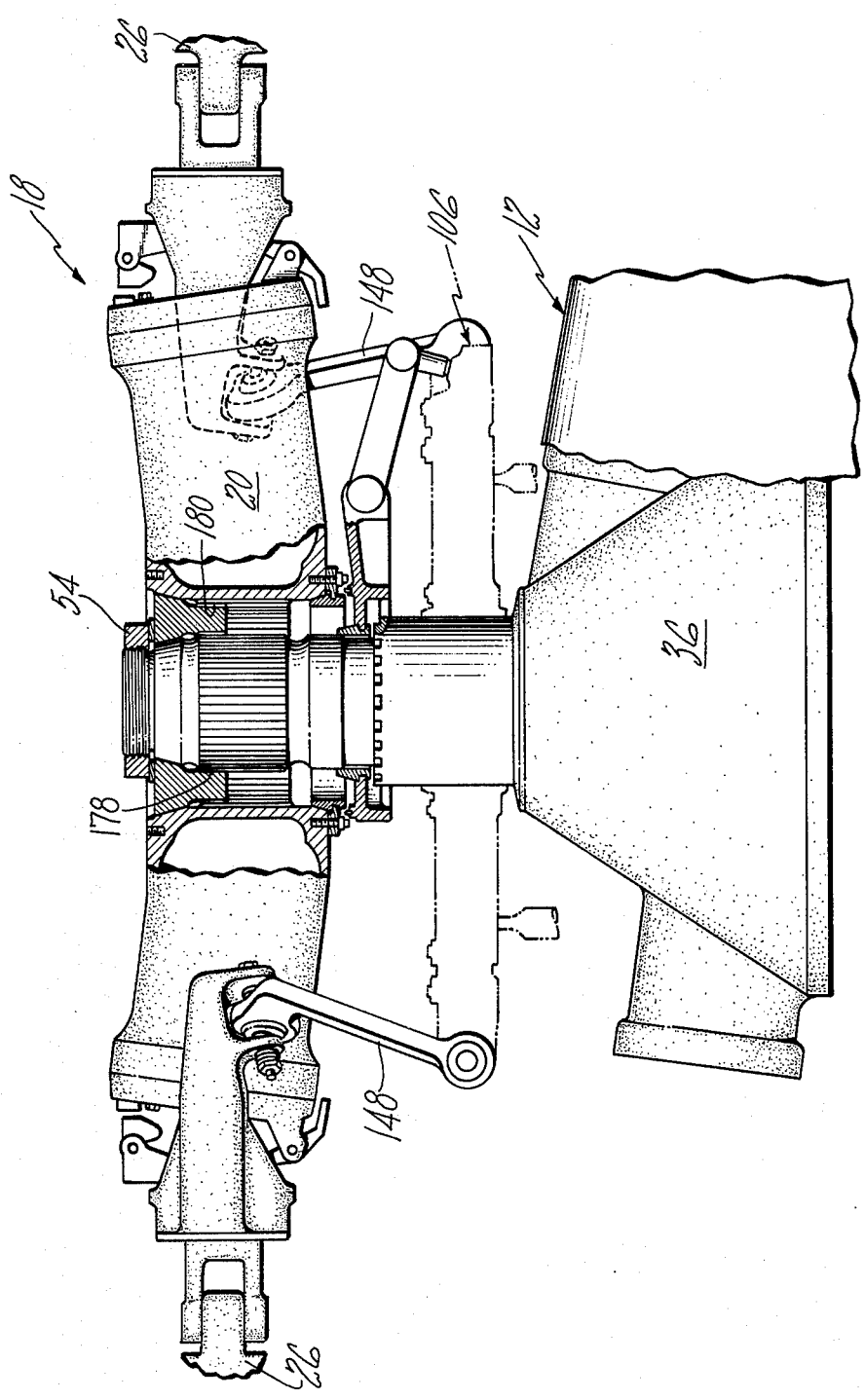
FIG. 6 is a partial showing of the two position helicopter rotor secured in its retracted, transportable position.

It will be noted that the outer surface 90 of shaft extension 50 is of substantially uniform diameter throughout its length along axis 20 and sufficiently smaller than the maximum inner diameter 96 of rotor hub 20 that rotor hub 20 may be moved along axis 22 in sleeve fashion along shaft extension 50 between its FIG. 2 flight position and its FIG. 6 transport position. It will further be noted that due to the connection between hub 20 and extension shaft 50, once released, the helicopter rotor 18 may be moved along extension shaft 50 toward fuselage 12 to the retracted or transportable FIG. 4 position of rotor 18, and then back to its FIG. 1 flight or operational position without interference between extension shaft 50 and hub 20.

Referring to FIGS. 1 and 2 we see that blades 26 extend radially outwardly from hub 20 and are connected thereto for pitch change motion about feathering axis 98 and for folding about folding axis 100. The connection between blades 26 and hub 20 about folding axis 100 may be of the type shown in U.S. Pat. No. 2,405,777 so that blades 26 may be manually folded with respect to hub 20 when desired. In conventional fashion, blade 26 is permitted to flap with respect to hub 20 and the amount of flapping is controlled by flap stop 102, while the amount of droop is controlled by droop stop 104, which may be of the type more fully disclosed in U.S. Pat. No. 2,614,640.

Swashplate assembly 106 is supported from standpipe 24 for tilt motion about spherical centering bearing 108. Swashplate assembly 106 comprises stationary portion 110 which is connected to rotary portion 112 through antifriction bearing 114. Rotary portion 112 has control rods 116 extending therefrom and connecting to pitch horn 118 of blades 26 through spherical joint unit 120. Scissors 66 connects rotatory portion 112 to shaft assembly 24 for rotation therewith. Hydraulic servos 122 are connected to swashplate 106 through ball joint connection 124 so that through extension and retraction thereof, swashplate 106 may be caused to move along axis 22 on standpipe 44 to cause the blades 26 to change pitch collectively or may be cause to tilt with respect to axis 22 so as to cause blades 26 to change pitch cyclically.

It will be noted that FIG. 2 shows main lift rotor 18 in its elevated or flight operational position with respect to fuselage 12 so that there is a substantial distance between rotor 18 and fuselage 12. It will further be observed by viewing FIG. 2 that rotor 18 is driven by main rotor drive shaft 46 which, in turn, drives shaft extension 50, which connects to the rotor 18. When helicopter 10 is operating with the rotor 18 positioned as shown in FIG. 2, reduced vibration, and less drag is created due to the vertical clearance between rotor 18 and fuselage 12. The FIG. 2 arrangement has the disadvantage, however, that the total height of helicopter 10 is higher than desired for transportability of helicopter 10 aboard another vehicle. Transportability of helicopter 10 can be achieved by bringing rotor 18 into close proximity to fuselage 12 and the construction taught herein permits lowering or retracting of rotor 18 into close proximity with fuselage 12 with blades 26 attached to hub 20.

Figure 3:
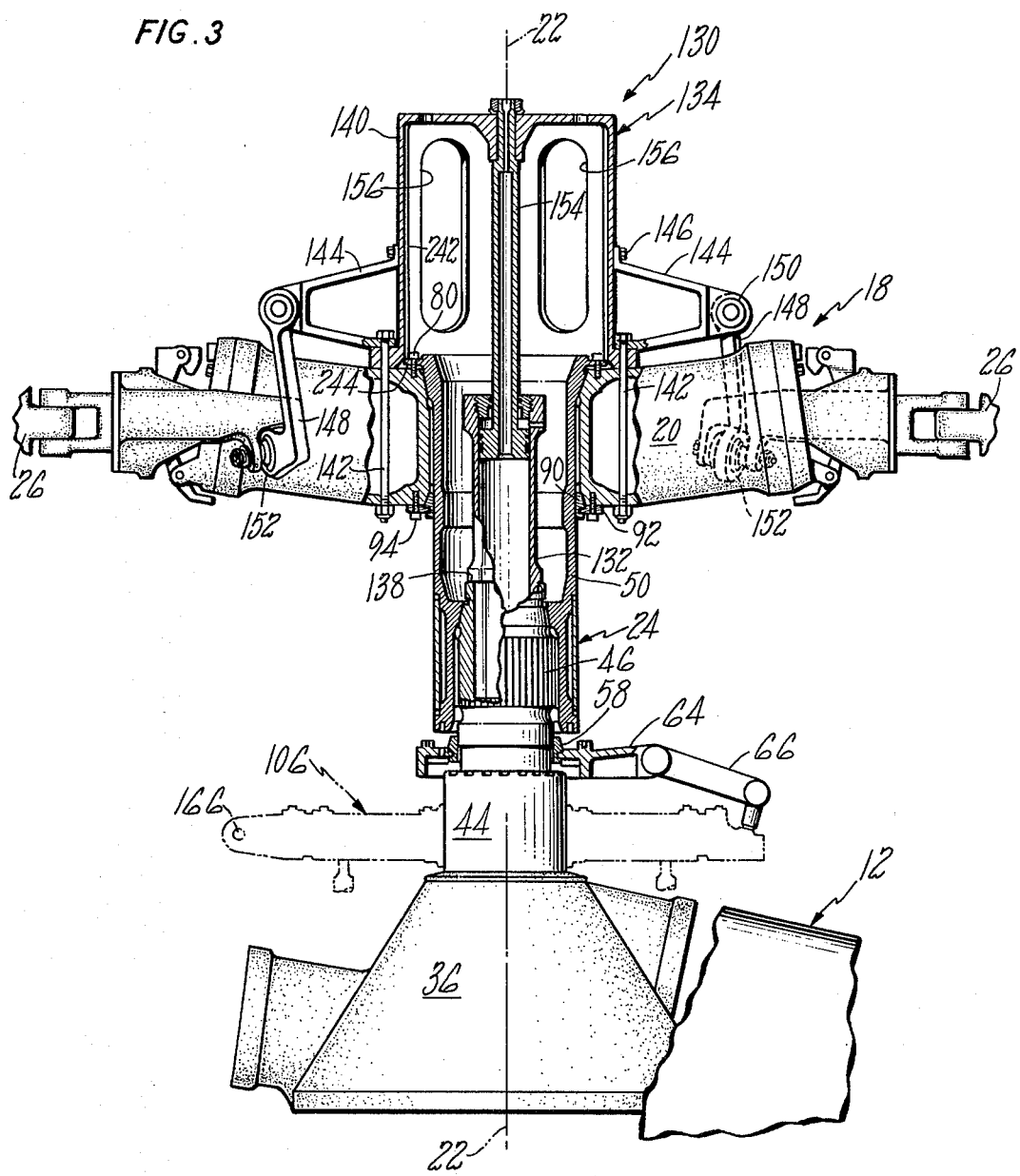
FIG. 3 is a partial showing of the two position helicopter rotor in its flight position and with tool installed in preparation for lowering the rotor from its flight position to its retracted, transportable position.

The manner in which rotor 18 is lowered from its FIG. 2 flight position to a position of proximity to fuselage 12 is best understood by viewing FIGS. 3 and 4. It should be noted that while FIGS. 3–6 show one half of the rotor installation, the other half is identical but allochiral thereto for all purposes of present concern. The first step in the operation for preparing helicopter 10 for transportability is the removal of preload bolts 68 to permit the withdrawal of split cone 58 from between shafts 46 and 50 and the lowering of the pressure plate 64 of pressure plate scissors combination 66 against the top of standpipe 44 as shown in FIG. 4 so that pressure plate teeth 126 are matingly received in grooves 48 of standpipe 44 so that standpipe and transmission housing 36 react the wind torque of the rotor hub 20 when the hub is lowered and piloted to the pressure plate 64 in a fashion to be described. It will be evident to those skilled in the art that equivalent torque transmitting connections could be substituted for the groove-tooth connection disclosed in FIG. 4 between standpipe 44 and pressure plate 64.

Preload bolts 70 are then removed to permit the removal of mast nut 54 from the main rotor shaft 46.

Tool assembly 130, which consists basically of a fixed portion 132 and a movable portion 134 is then connected to rotor 18 as shown in FIG. 3. The fixed portion 132 of tool 130 extends into the hollow interior of drive shaft 46 and bears against the top surface 138 thereof for piloting thereby. The movable portion 134 of tool 130 includes frame member 140, which is attached to and piloted by rotor hub 20 through its connection thereto by attachment bolts 142. Movable portion 134 of tool 130 also includes arm members 144, which are attached to and project radially outwardly from frame member 140 due to connection thereto by conventional connecting means 146 and connecting bolts 142. Link members 148 extend from the outer ends of arm members 144 and are connected thereto by spherical connection 150 and are connected at their opposite ends by spherical connection 152 to the pitch horn 118 of each blade 26 after control rods 116 (FIG. 1) have been removed. Rod and piston member 154 extend from frame or support member 140 and cooperate with fixed portion 132 to define a hydraulic or pneumatic cylindrical-piston drive arrangement.

By viewing FIG. 3, we see that rotor hub 20 with blades 26 connected thereto is still connected to extension shaft 50 but it is also connected to the movable portion 134 of tool member 130 and blades 26 are being held in fixed pitch position with respect to hub 20 by the action of links 148. Control rods 116 are removed and the blades pitch horns 118 are connected to links 148 after tool assembly 130 is otherwise in position as shown in FIG. 3. Torsional or windmilling of rotor hub 20 and blades 26 is prevented by grooves 242 in tool 130 and slots 244 in the outer perimeter of shaft extension 50 which is still connected to drive shaft 46 by spline 52 during raising and lowering of rotor 18.

With tool 130 connected to the rotor 18 as shown in FIG. 3, we next release rotor hub 20 from extension shaft 50. This is done by first releasing preload bolts 94 which permits pressure plate 92 to back out and loosen split cone ring 90. Preload bolts 80 are then removed through access holes 156, thereby releasing hub 20 with blades 26 attached thereto from extension shaft 50. The hydraulic or pneumatic cylinder-piston portion 132–154 of tool 130 is then used to hydraulically or pneumatically lower the movable portion 134 of tool 130 and rotor hub 20 with blades 26 attached thereto from the FIG. 2 and 3 flight position to the FIG. 4 retracted or stowed position. when hub 20 is brought to its FIG. 4 retracted position, dowel pins 160 of pressure plate 92 matingly engage dowel pin holes 162 (see FIG. 2) of pressure plate 64 and serve to react wind torque, since pressure plate 64 is already connected to standpipe 44 through connection 48–126.

For a better understanding of the construction of split cones 58 and 86 and their related mechanisms for removal or release of said cones and the manner in which rotor hub 20 is supported against rotation due to wind blasts and head moments when in its retracted position reference will now be made to FIGS. 7–10.

Figure 7:
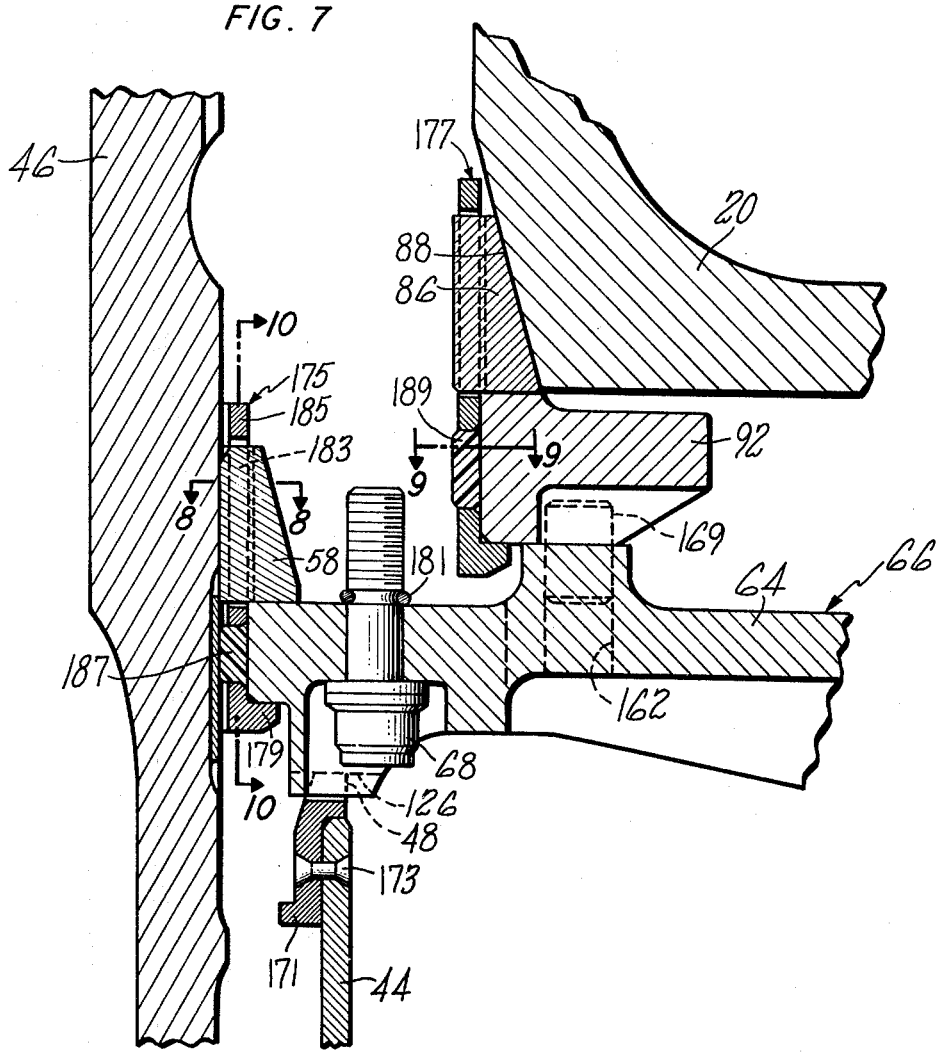
FIG. 7 is an enlarged cross-sectional showing of a portion of the rotor when in its FIG. 6 position.
Figure 8:
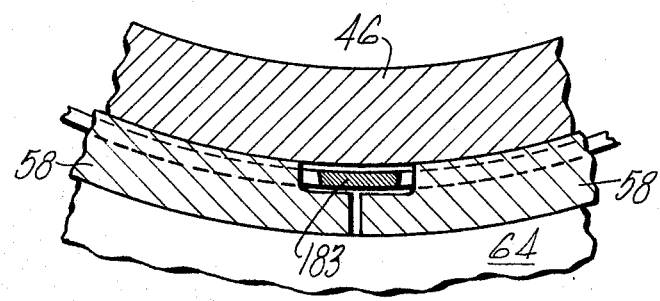
FIG. 8 is a view taken along line 8—8 of FIG. 7.

Referring to FIG. 7, we see an enlarged cross-sectional showing of a portion of the rotor in its FIG. 5 retracted position and with extension shaft 50 removed. FIG. 7 shows that when the rotor hub 20 is in the FIG. 5 retracted position, standpipe 44, and more particularly the radial grooves 48 thereof matingly engage radial lugs 126 in pressure plate 64 so as to connect standpipe 44 and pressure plate 64 to prevent rotation about axis 22 therebetween. Further, dowels 169 which project downwardly from pressure plate 92 are received in dowel hole 162 so as to prevent similar rotation between pressure plates 64 and 92, the latter of which remains connected to hub 20 by loosened preload bolts 94 as shown in FIG. 5.

FIGS. 7-10 further show in greater particularity some of the details of the construction of the parts involved. By viewing FIG. 7 it will be noted that while grooves 48 may be machined directly in the top of standpipe 44, it is preferable that they be machined in seal liner 171 which is connected to the top of standpipe 44 by rivets 173. Additionally, split cone pullers or puller cages 175 and 177 are used in combination with pressure plates 64 and 92 and split cones 58 and 86 to assist in pulling of split cones 58 and 86 when they are to be withdrawn from their preloaded, operable FIG. 2 positions. Pullers 175 and 177 may be identical so that puller 175 only will be described. Puller 175 includes a lower flange or projection member 179 which abuts pressure plate 64 so that as preload bolt 68 is backed out, bolt rings 181 serve to pull pressure plate 64 downwardly as bolt 68 is untorqued and pressure plate 64 carries puller 175 therewith, which in turn carries split cone members 58 therewith since, as best shown in FIG. 10, puller 175 also includes the extension members 183 which extend vertically between grooves in split cone 58 and join bottom flange 179 to upper flange 185, best shown in FIG. 10, so that the withdrawal of puller 175 by pressure plate 64 will serve to also withdraw split cones 58.

To guide rotor hub 20 concentrically about extension shaft 50 as the rotor travels between its extended and retracted position and vice versa, nylon or other bearing material pellets 187 and 189 are supported from pullers 175 and 177, respectively, and project slightly radially inwardly thereof so as to bear frictionlessly against the outer surfaces of extension shaft 50, during motion of the rotor therealong and during the extraction of shaft extension 50 from within rotor hub 20, as best shown in FIGS. 7 and 9.

With rotor 18 in its FIG. 4 retracted or stowed position, link members 148 are then disconnected from their upper connection 150 and pivoted about their lower connection 152 and are connected to swashplate connecting hole 166 previously occupied by control rods 116. This new position of links 148 is best shown in FIG. 5. Bolts 142 connecting tool movable portion 134 to hub 20 are then removed. Bolt members 168 are then passed through apertures 170 in tool 130 and threaded into threaded holes 172 in the top of extension shaft 50 to connect the movable portion 134 of tool 130 to the extension shaft 50. The power cylinder-piston mechanism 132-154 of tool 130 is then hydraulically or pneumatically powered to unseat extension shaft 50 from drive shaft 46 and raise extension shaft 50 clear of the hub so that tool member 130 with extension shaft so removed can be removed from rotor 18 and stored for use when the rotor 18 is to be moved back to its FIG. 2 operable position. Finally, antitorque and head moment split ring 176 is positioned between hub 20 and drive shaft 46 and connected by spline attachment 178 and 180 thereto and is held in position by mast head nut 54 so that, as best shown in FIG. 6, helicopter main lift rotor 18 is securely stored in its retracted or transportable position in immediate proximity eleveation-wise to fuselage 20 and is supported from the fuselage and drive shaft 46 so that any wind or torque loads thereagainst are reacted. The blades thereof are connected to swashplate 106 so that the pitch thereof can be changed if desired at any time and for any reason.

The blades 26 are then manually folded to complete the pre-shipment procedure.

By reversing the above described procedure, the helicopter 10 may be readied for normal flight operation wherein rotor 18 is elevated from its FIG. 6 stowed, retracted or transportable position to its FIG. 2 elevated or operable flight position.

An alternate arrangement for connecting rotor hub 20 to extension shaft 50 is shown in FIG. 11. In this construction the hub lower end is supported from extension shaft 50 using the same split cone 86-pressure plate 92-preload bolt 94-puller cage 177 arrangement previously described but the upper end of rotor hub 20 is supported from extension shaft 50 using different mechanisms than in the FIG. 2-6 construction. Extension shaft 50 is fabricated to have a relatively heavy, load carrying circumferential extending lift flange 191 projecting from its upper end. Lift flange 191 is adapted to be connected to top surface 193 of hub 20 by means of a plurality of bolt members 195 which extend through apertures in the flange 191 and are threadably received in hub 20. Chafing gaskets or washers 197 are positioned between top surface 193 of hub 20 and surface 199 of lift flange 191 and are particularly helpful to prevent chafing when these parts are made of titanium. The coaction of bolts 195, lift flange 191 and hub 20 shown in FIG. 11 serves to react the head moments of rotor 18 about extension shaft 50.

Figure 12:
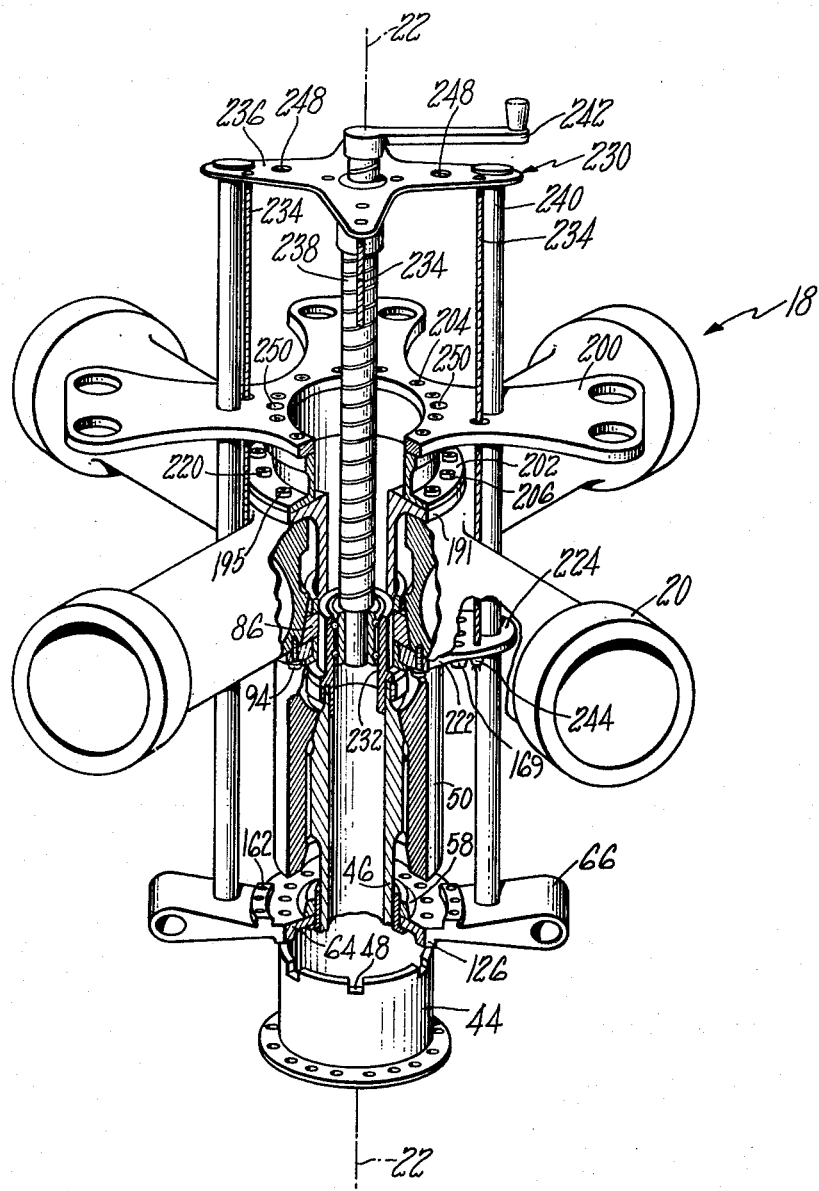
FIG. 12 is a showing of the helicopter rotor in its flight position and using a modified tool form for the rotor moving operation.

In some helicopter rotor installations, a bifilar or other vibration absorber assembly 200 is supported from the rotor, possibly as shown in FIG. 12, wherein vibration absorber support 202 extends above the top of extension shaft 50 and is connected thereto and to rotor hub 20 so as to support vibration absorber unit 200 thereabove with the cooperation of bolt mechanisms 204. Vibration absorber assembly 200 may be of the type disclosed in U.S. Pat. No. 3,540,809. In addition to bolts 195, expansion bolts 206 also connect lift flange 191 to hub 20, and are prevented from falling out by a reduced hole in absorber 202 therefrom. Bolts 206, serve to expand the expanding cones 208, which project between expansion bolt 206 and apertures 210 and 212 in head flange 191 and hub 20, respectively, and serve to take out the torque between hub 20 and extension shaft 50. Expansion bolts 206 and their cooperating mechanism actually take the place of spline 78 in the FIG. 2-6 construction. It will be noted that nylon or other bearing material pellets 214 project from the inner surface 216 of hub 20 and serve to concentrically guide extension shaft 50 within hub 20 inner surface 216 frictionlessly when extension shaft 50 is being extracted therefrom as shown in FIG. 5.

Figure 13:
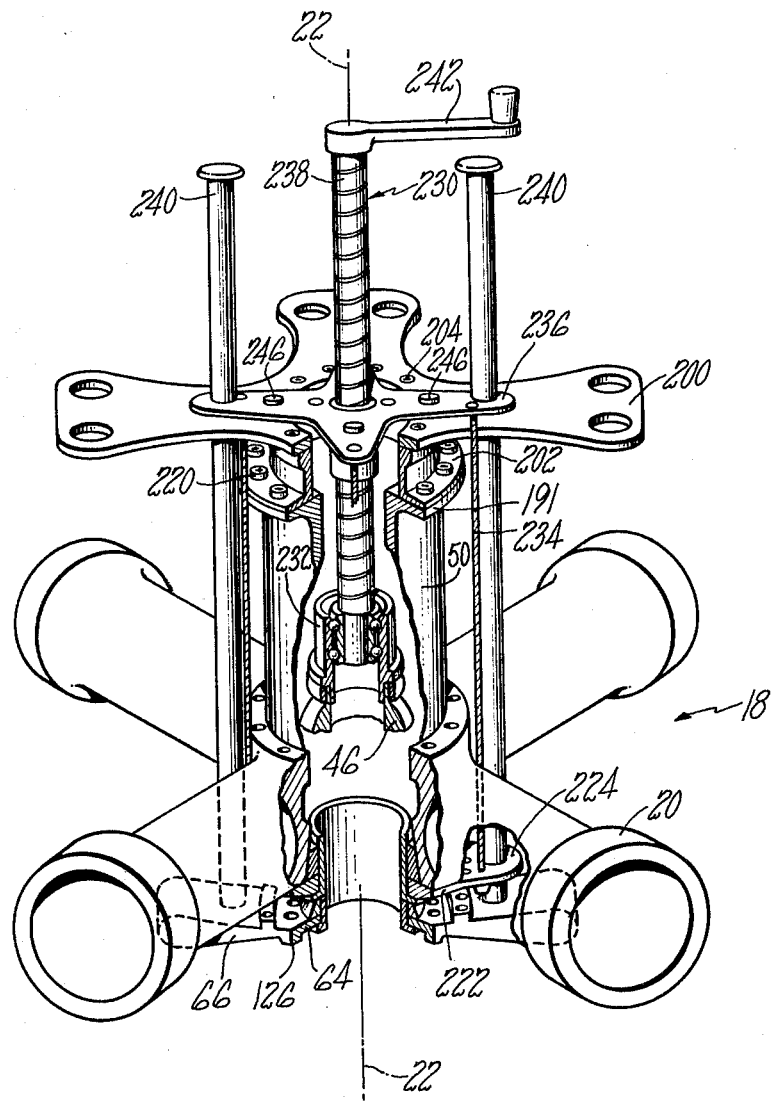
FIG. 13 corresponds to FIG. 12 but with the rotor in its retracted or lowered position.
Figure 14:
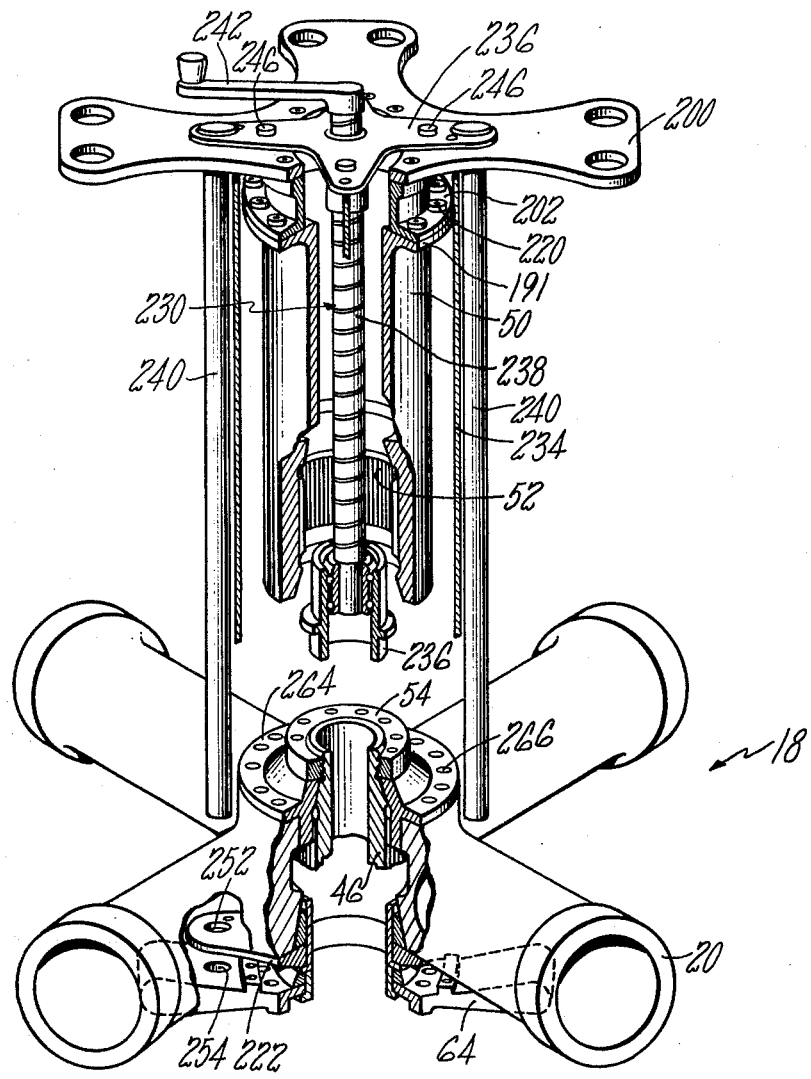
FIG. 14 corresponds to FIG. 12 but with the extension shaft and tool removed and with the rotor hub and blades secured in position to the fuselage in their retracted, transportable position, prior to blade folding.

In rotor installations where it is desirable to remove the vibration absorber mechanism, in conjunction with the extension shaft in connection for transportational requirements, the constructions shown in FIGS. 12-14 could be used. This FIG. 12-14 construction is similar to the previously described construction of FIGS. 2-6 except that a vibration damper ring 200 is supported vertically above the helicopter hub, the bottom pressure plate (92 in FIGS. 2-6) is modified in construction, and the extension shaft 50 is connected to the rotor hub 20 in the fashion shown in FIG. 11. In describing the FIG. 12-14 construction, corresponding parts of the FIG. 2-6 construction will be given the same reference numerals.

In viewing FIGS. 12-14, it will be noted that hub 20 of rotor 18 is connected to extension shaft 50 in the same fashion as shown in FIG. 11. In both the FIG. 11 and FIG. 12–14 construction, it is important to note that vibration damper support 202 is connected to extension shaft lift flange 191 by three separate types of bolts, namely, the head moment bolts 195, the torque reacting expansion bolts 206, and a third set of bolts 220 which serve to connect vibration damper support 202 to lift flange 191 and which are used in the rotor stowing operation as described hereinafter. In the FIG. 12 construction, it will be noted that pressure plate 222 is modified from pressure plate 92 of the FIG. 2–6 construction in that it includes lobe members 224 extending radially therefrom at circumferential stations between the arms of hub 20.

The construction of the FIG. 12–14 embodiment and its similarity to the FIG. 2–6 construction will most readily be understood by describing its manner of operation in lowering helicopter rotor 18 from the flight position shown in FIG. 2 to the stowed position shown in FIG. 6.

As with the FIG. 2–6 procedure, the procedure for lowering hub 20 with blades 26 of rotor 18 using the FIG. 12–14 construction commences with the removal of pressure plate bolts 68 (see FIG. 2) and releasing cone elements 58 and associated parts on the lower end 50b of extension shaft 50, which are precisely the same construction as shown in FIGS. 2 and 7. Pressure plate 64 is then lowered and rests upon standpipe member 44 so that its tabs 126 matingly engage recesses 48 to provide torsional restraint between plate member 64 and standpipe 44 against wind loads and to provide lateral restraint against the main drive shaft 46 during the lowering operation. Preload bolts 70 are then loosened and mast nut 54 (see FIG. 2) is then removed from the upper end of the main rotor drive shaft 46. It will therefore be noted that main drive shaft 46 is connected to extension shaft 50 in the FIG. 12–14 construction in precisely the same fashion that it is in FIG. 2–6 construction.

Ball screw fixture 230 is then brought into position as shown in FIG. 12 so that its anti-torque bearing portion 232 is shouldered and piloted in drive shaft 46. Four lifting cables 234 are then connected between star member 236 and lobes 224 of pressure plate 222. Torsional restraint during rotor motion is provided to overcome wind loads on the rotor hub and blades and to react torque between the support star 236 and the ball screw member 238 by anti-torque rods 240 which are supported between vibration absorber ring 200 and scissors and pressure plate member 66 and are piloted as they extend through apertures in the lobes 224 of base pressure plate 222. Cables 234 are substituted for bolts 142 of the FIG. 2–6 construction to reduce weight and for simplicity of construction. Anti-torque rods 240 perform the function of the axially extending groove 242 in frame member 140 of the FIG. 2–6 construction which coacts with tab 244 extending from the outer periphery of extension shaft flange 82 (see FIG. 3) which provides torsional restraint of the hub as it is lowered from its FIG. 1 to its FIG. 6 position.

It will be noted that tool member 230 consists of stationary portions 232, 238 and 240 and movable portions 234 and 236 in similar fashion to tool 130 of the FIG. 2–6 construction.

Control rods 116 between the swashplate 106 and the pitch horns 118 are then removed and link members 148 may or may not be used to connect blades 26 to hub 20 so as to prevent blade pitch change motion during the hub and blade lowering process. If time is a serious factor, links 148 may be omitted in that part of the procedure. When blades 26 are connected to hub 20 through elastomeric bearings of the type shown in U.S. Pat. No. 3,782,854 the restraint to pitch change motion offered by such bearings may make the elimination of the use of links 148 in this part of the procedure of minimal concern.

The next step in the procedure is to loosen preload bolts 94 of pressure plate 222 and release cone elements 86 thereby in the fashion previously described in connection with FIGS. 7–10. The next step in the procedure is to remove bolts 195 and 206 between vibration damper support 202 and shaft extension lift flange 191, thereby leaving bolt members 206 as the only connection between support 202 and flange 191.

We next lower rotor hub 18 with blades 26 attached by manually turning handle member 242, which causes screw member 238 to rotate and lower star member 236 and hence pressure plate 222, and hence hub 20 and blades 26 due to ball screw action, until hub 20 with blades 26 attached thereto are in their FIG. 13 retracted or transportable position with pressure plate 64 connected to standpipe 44 by the coaction of lugs 126 matingly engaging grooves 48 and pressure plate 220 engaging pressure plate 64 by the coaction of dowels 169 in dowel holes 162 as shown in FIG. 7 so that hub 20 with blades 26 attached thereto are held in torsional restraint from the transmission when in the FIG. 13 retracted position. With rotor 18 in its retracted or lowered position shown in FIG. 13, links 148 are then connected between the pitch change horn and the swashplate as shown in FIGS. 5 and 6. The blade pitch control system of the aircraft may then be activated so that the pitch of the blades may be varied as desired during the manual blade folding operation or at any other time, such as during the stowage or helicopter reactivating procedures. The lifting cable nuts 244 (see FIG. 12) are then removed from cables 234 at the bottom of hub pressure plate 222 and star member 236 is connected to the top of vibration absorber ring 200 by bolt members 246 which extend through holes 248 in star 236 and 250 in vibration absorber ring 200 (see FIG. 12).

We then reverse the direction of rotation of crank 242 so that by the above described ball screw action, extension shaft 50 is unseated from drive shaft 46, and extension shaft 50 is raised clear of the drive shaft 46, with vibration damper ring 200 and support 202 attached thereto to the position shown in FIG. 14 so that the entire unit may be lifted free of pressure plates 222 and 64 since anti-torque rods 240 have been passing through aligned holes 252 and 254 therein. Split dummy spacer member 264 is then inserted as shown in FIG. 14 so that its ID spline mates with main drive shaft spline 52 and so that the peripheral flange of dummy spacer member 264 is connected to the bolt holes of hub 20 by connecting means 266. Mast nut 54 is then screwed onto the threaded connection at the top of drive shaft 46 so that dummy spacer 264 and the action of pressure plate members 222 and 64 as best shown in FIG. 7 react any torsional or any head moments loading on rotor 18. The blades 26 are then folded to their minimal envelope position for helicopter stowage on transport as in connection with the FIG. 2–6 construction.

It will therefore be seen that the FIG. 12–14 construction is very similar to the FIG. 2–6 construction in that all helicopter parts are common, in that extension shaft 50 is connected and supported from drive shaft 46 in precisely the same fashion as shown in FIG. 2, and in that hub 20 is connected and supported from extension shaft 50 in the fashion shown in FIG. 11 and could as well have been attached thereto in the fashion shown in FIG. 2.

Although the invention has been shown and described with respect to a preferred embodiment thereof, it should be understood by those skilled in the art that other various changes and omissions in the form and detail thereof may be made therein without departing from the spirit and the scope of the invention.

We claim:
1. A helicopter having:
   A. a fuselage,
   B. a main lift rotor including hub and blades,
   C. means to support said lift rotor in two positions of elevation about the helicopter fuselage including:
      1. a first shaft supported to project upwardly from the helicopter fuselage and to be rotated about an axis of rotation,
      2. a second shaft connected at its first end to the first shaft so that its sescond end is positioned in greater vertical elevation above the fuselage than said first shaft and so that said second shaft is driven in rotation about said axis of rotation by said first shaft, and
      3. means connecting said rotor to said second shaft second end for rotation therewith about said axis of rotation and so that said rotor may be disconnected from said second shaft second end and lowered with the blades attached to be connected to said first shaft.
2. A helicopter according to claim 1 wherein said second shaft is of substantially circular cross section and has a selected maximum diameter, and wherein said rotor hub has a central aperture of substantially circular cross section to permit it to be sleeved along the second shaft and shaped so that its minimum inner diameter is greater than the maximum diameter of the second shaft throughout the region of hub motion.
3. A helicopter according to claim 2 wherein said first shaft is a main rotor drive shaft, wherein said second shaft is an extension shaft, and including first means connecting said drive shaft to said extension shaft first end, and second means connecting said rotor hub to said extension shaft second end.
4. A helicopter according to claim 3 wherein said second connecting means includes:
   A. spline means connecting the outer diameter of the extension shaft second end to the inner diamter of the hub and extending along said axis of rotation so that the rotor hub may be moved with respect to the shaft extension along the axis of rotation,
   B. peripheral flange means extending from the outer end of said shaft extension to be juxtapositioned to the top surface of the hub,
   C. cooperating conical surfaces between said extension shaft outer diameter surface and said hub inner diameter surface adjacent the hub top surface shaped to define a lifting cone connection therebetween,
   D. means connecting said flange means to said hub top surface to establish a preloaded condition therebetween along said lifting cone connection,
   E. means supporting the lower side of the hub in preloaded condition from the extension shaft outer surface.
5. A helicopter according to claim 3 wherein said second connecting means includes:
   A. a circumferential lift flange projecting radially from the top of said extension shaft and having a top surface, and having a bottom surface juxtapositioned to the rotor hub top surface,
   B. rotor head moment reacting means connecting said lift flange to said rotor hub top surface, and
   C. rotor torque reacting means connecting said lift flange to said hub top surface.
6. A helicopter according to claim 5 wherein said rotor head moment reacting means constitutes a plurality of bolt members positioned circumferentially about the top surface of said lift flange and extending through apertures in said lift flange and threadably engaging threaded apertures in said hub, and wherein said rotor torque reacting means comprises at least one bolt member extending through said lift flange top surface and through aligned apertures in said lift flange and said hub.
7. A helicopter according to claim 6 and wherein said torque reacting bolt member is an expansion bolt having expansion washers extending between the bolt and the aligned apertures.
8. A helicopter according to claim 4 wherein said first connecting means includes:
   A. an axial spline connection between the inner diameter of the first end of the extension shaft and the outer diameter of the drive shaft, a conical interface between the drive shaft outer diameter surface and the extension shaft inner diamter surface at a position on the rotor side of the extension shaft from the axial spline connection, a mast nut threadably engaging the drive shaft at a station closer to the extension shaft second end than said conical interface, preload means acting on said mast nut to preload the drive shaft and the extension shaft along the conical interface, and means to support the extension shaft inner end from the drive shaft outer diameter in preloaded fashion.
9. A helicopter according to claim 8 wherein said means supporting the hub lower side from the extension shaft outer diameter and said means supporting the extension shaft inner end from the drive shaft outer diameter constitute: split ring cone shaped members matingly engaging corresponding surfaces on the extension shaft and hub and the extension shaft and drive shaft, respectively, a pressure plate member preloadable to preload the split cone members between said parts.
10. A helicopter according to claim 9 including means to support said drive shaft for rotation about an axis of rotation including:
   A. a transmission housing,
   B. a standpipe extending vertically from said transmission housing, and wherein said interconnection between said pressure plate member of said extension shaft-to-drive shaft connecting means is between said pressure plate and said standpipe.
11. A helicopter according to claim 10 and including a swashplate supported from said standpipe for motion therealong and tilting with respect thereto and including:
   A. a stationary portion, a rotatable portion, means connecting said rotatable portion to each of said blades to effect pitch change motion of said blades through swashplate motion, and scissors means connecting said swashplate rotatable portion to the pressure plate member of said extension shaft-to-drive shaft interconnecting means.

12. A helicopter according to claim 9 and including means to prevent rotation between the rotor hub and blades and the fuselage when the rotor is in its lowered position.

13. A helicopter according to claim 12 wherein said rotation preventing means includes:
  A. means interconnecting the pressure plate member of said extension shaft-to-drive shaft interconnecting means to the helicopter fuselage to prevent rotation therebetween when the rotor is in its lowered position, and
  B. means interconnecting both pressure plate members when the rotor is in its lowered condition to prevent rotation of the rotor with respect to fuselage.

14. A helicopter according to claim 9 and including means operatively connected to said pressure plate members and said split cone members so as to pull said cones out of engagement with their mating surfaces when the pressure plate member is withdrawn.

15. A helicopter according to claim 1 and including frictionless means to concentrically guide the motion of the hub over the extension shaft during the hub lowering operation.

16. A helicopter according to claim 1 and including:
  A. means to connect said hub to said first shaft when so lowered to prevent torsional motion and react head moments therebetween.

17. A helicopter according to claim 16 wherein the hub-to-first shaft connecting means includes at least one split cone member bearing against a corresponding conically shaped surface of the first shaft or the hub.

18. A helicopter according to claim 1 and including means to disconnect said rotor hub and blades from said second shaft second end and to lower said rotor with its blades attached so as to envelop the first shaft for connection thereto.

19. A helicopter according to claim 18 and including means to torsionally restrain said rotor hub and blades when being lowered.

20. A helicopter according to claim 19 and including means to connect said rotor to said first shaft when in its lower position.

21. A helicopter according to claim 1 and including means to prevent rotation between the rotor hub and blades and the fuselage when the rotor is in its lowered position.

22. A helicopter according to claim 21 wherein said rotation preventing means includes:
  A. means interconnecting the pressure plate member of said extension shaft-to-drive shaft connecting means to the helicopter fuselage to prevent rotation therebetween when the rotor is in its lowered position, and
  B. means connecting both pressure plate members when the rotor is in its lowered condition to prevent rotation of the rotor with respect to fuselage.

23. The method of moving a helicopter rotor with the blades attached thereto from a flight position remote from the fuselage to a transport position in close proximity to the fuselage wherein the rotor hub is initially connected to an extension shaft projecting from and supported by the rotor drive shaft and wherein the rotor hub is connected to the drive shaft in the transport position including the steps of:
  A. disconnecting the rotor hub from the shaft extension,
  B. controllably lowering the rotor hub with the blades attached thereto from said flight position to said transport position, removing said extension shaft from said drive shaft, and connecting said rotor hub to said drive shaft when in said transport position so as to prevent rotation of the hub and blades about the drive shaft and with respect to the fuselage.

24. The method according to claim 23 wherein said last step includes the step of anchoring the rotor hub to the fuselage against rotation.

25. The method according to claim 24 and including the additional step of connecting the blades to the fuselage when the rotor is in the transport position so that blade pitch may be controlled from the fuselage.

26. A method according to claim 25 wherein the last named step comprises connecting the helicopter blades to the rotor swashplate.

27. A method according to claim 26 and including the step of folding the rotor blades with respect to the rotor hub for improved stowability or transportability.

28. The method according to claim 26 including the additional step of supporting the blades in fixed relation to the hub to prevent pitch change variation during the rotor retraction procedure.

29. The method according to claim 23 wherein said rotor hub and blades are lowered from said flight to said transport position while being restrained from rotational motion with respect to the extension shaft.

30. The method of moving a helicopter main lift rotor from a first elevated position above the fuselage wherein the rotor is supported from an extension shaft projecting from a first shaft to a second elevated position above the fuselage wherein the rotor is supported from the first shaft comprising the steps of disconnecting the helicopter rotor from the extension shaft, securing the helicopter blades in fixed position with respect to the rotor hub, lowering the rotor with the blade so secured to the elevation of the first shaft, removing the extension shaft, and connecting the rotor to the first shaft.

31. The method of moving a helicopter main lift rotor from a first elevated position above the fuselage wherein the rotor is supported from an extension shaft projecting from a first shaft to a second elevated position above the fuselage wherein the rotor is supported from the first shaft comprising the steps of disconnecting the helicopter rotor from the steps of disconnecting the helicopter rotor from the extension shaft, lowering the rotor with the blade secured to the elevation of the first shaft while restraining the rotor from rotating with respect to the extension shaft during the lowering operation, removing the extension shaft, and connecting the rotor to the first shaft.

32. A tool adapted for use with a helicopter having a two-position rotor and adapted to be connected to and driven by an extension shaft member which extends substantially vertically from, is connected to and is driven by a main rotor drive shaft member, said tool having:
  A. a fixed portion adapted to be connected to and supported from said main drive shaft,
  B. a movable portion including:

1. a frame portion movably supported from said fixed portion for motion along the rotor axis of rotation,
2. means adapted to connect said frame portion to the helicopter rotor hub,
3. means to cause the tool movable portion to move with respect to the tool fixed portion when so connected to the rotor hub and blades so as to cause the rotor hub with blades to be lowered from its elevated position in attachment with the shaft extension to a position of equal elevation with the main drive shaft so as to envelop the drive shaft for connection thereto,
4. means to torsionally restrain said hub and blades from rotating during the hub and blades lowering operation,
5. means to attach said movable portion to said shaft extension, and
6. means to cause said movable portion so connected to said shaft extension to move in the opposite direction and remove said shaft extension from said drive shaft.

33. A tool according to claim 32 and including arm members connected to and projecting outwardly from said frame portion, means supported by said arm members and adapted to be connected to the helicopter rotor blades so as to restrain the blades in fixed relation with respect to the hub.

34. A tool according to claim 33 wherein said means adapted to be connected to said blades are connected to said arm members through a ball joint connection.

35. A tool according to claim 34 wherein said means to connect said frame portion to the rotor hub constitutes a plurality of bolts adapted to extend through the frame portion and the rotor hub so as to connect the two.

36. A tool according to claim 35 wherein said means to cause said movable portion of the tool to move relative to the fixed portion of the tool is a power piston-cylinder mechanism.

37. A tool according to claim 33 wherein said means to connect the helicopter rotor blades to the hub are constructed to be detachable from the arm members when the helicopter hub and blades are in their lowered position enveloping the drive shaft and to then be connected to the conventional helicopter pitch control system.

38. A tool according to claim 37 wherein said frame portion includes access holes to permit access to the rotor interior portions during the rotor moving operation.

39. A tool according to claim 38 shaped so that its fixed portions is piloted in the drive shaft member and so that its movable portion is piloted on the rotor hub.

40. A tool according to claim 32 wherein said torsional restraint means comprises cooperating tongue and groove members extending between said frame portion and the extension shaft member.

41. A tool according to claim 32 wherein said torsional restraint means comprise one or more antitorque rods adapted to be anchored to the fuselage and extend through said frame portion and the hub or hub connected parts.

42. A tool according to claim 32 wherein said means to connect said frame portion to rotor hub constitute one or more cable members hanging from the frame member and adapted to be connected to and support the rotor hub therefrom.

43. A tool according to claim 42 wherein said means to cause said movable portion of the tool to move relative to the fixed portion of the tool is a jack screw mechanism.

44. A tool according to claim 43 shaped so that its fixed portion is piloted in the drive shaft and so that its movable portion is piloted on the rotor hub.

45. A helicopter having a rotor retractable from an elevated position to a retracted position including:
A. a helicopter fuselage,
B. a rotor drive shaft projecting from said helicopter fuselage and supported therefrom for rotation about an axis of rotation,
C. an extension shaft projecting vertically above said drive shaft and connected at its first end thereto to be drivingly rotated thereby about said axis of rotation and so that its second end is in a position farther removed from said fuselage than is said drive shaft,
D. a helicopter rotor including:
1. a hub connected to the second end of said extension shaft in said elevated position,
2. a plurality of blades extending substantially radially from said hub and supported therefrom for pitch change motion,
E. means to move said rotor between said elevated position and a retracted position wherein said rotor hub envelops said drive shaft for connection thereto.

46. A helicopter according to claim 45 wherein said rotor moving means includes:
A. a stationary portion adapted to be connected to and supported from said drive shaft, and
B. a movable portion connected to said stationary portion and adapted to be movable with respect thereto along said axis of rotation and including:
1. a frame member operably connected to said hub,
2. arm members projecting substantially radially from said frame member and connected thereto,
3. means to connect said blades to said arm members so as to prevent pitch change motion of said blades with respect to said hub during the rotor moving process,
4. means to cause said movable portion to move with respect to said fixed portion along said axis of rotation to thereby lower said rotor hub and blades once disconnected from said extension shaft to said retracted position,
5. means to connect said movable portion so lowered to said extension shaft, and
6. means to cause said movable portion to move with respect to said fixed portion in the opposite direction and carry said shaft extension out of contact with said drive shaft.

47. A helicopter according to claim 46 including means to connect the helicopter hub with blades attached thereto to the fuselage when in said retracted position.

48. A helicopter according to claim 45 and including first means connecting said drive shaft to said extension shaft first end, and second means connecting said rotor hub to said extension shaft second end.

49. A helicopter according to claim 40 wherein said second connecting means includes:
A. spline means connecting the outer diameter of the extension shaft second end to the inner diameter of the hub and extending along said exis of rotation so that the rotor hub may be moved with respect to the extension shaft along the axis of rotation, B. peripheral flange means extending from the outer end of said shaft extension to be juxtapositioned to the top surface of the hub, C. cooperating conical surfaces between said extension shaft outer diameter surface and said hub inner diameter surface adjacent the hub top surface shaped to define a lifting cone connection therebetween, D. means connecting said flange means to said hub top surface to establish a preloaded condition therebetween along said lifting cone connection, and E. means supporting the lower side of the hub in preloaded condition from the extension shaft outer surface.

50. A helicopter according to claim 49 wherein said first connecting means includes:

A. an axial spline connection between the inner diameter of the first end of the extension shaft and the outer diameter of the drive shaft, a conical interface between the drive shaft outer diameter surface and the extension shaft inner diameter surface at a position on the rotor side of the extension shaft from the axial spline connection, a mast nut threadably engaging the drive shaft at a station closer to the extension shaft second end than said conical interface, preload means acting on said mast nut to preload the drive shaft and the extension shaft along the conical interface, and means to support the extension shaft inner end from the drive shaft outer surface in preloaded fashion.

51. A helicopter according to claim 50 wherein said means supporting the hub lower side from the extension shaft outer surface and said means supporting the extension shaft inner end from the drive shaft outer surface constitute: split ring cone shaped members matingly engaging corresponding surfaces on the extension shaft and hub and the extension shaft and drive shaft, respectively, a pressure plate member preloadable to preload the split cone members between said parts.

52. A helicopter according to claim 45 wherein said rotor moving means includes:

A. a fixed portion adapted to be connected to and supported from said main drive shaft, B. a movable portion including:
1. a frame portion movably supported from said fixed portion for motion along the rotor axis of rotation,
2. means adapted to connected said frame portion to the helicopter rotor hub,
3. means to cause the tool movable portion to move with respect to the tool fixed portion when so connected to the rotor hub and blades so as to cause the rotor hub with blades connected thereto to be lowered from its elevated position in attachment with the shaft extension to a position enveloping the drive shaft for connection thereto,
4. means to torsionally restrain said hub and blades from rotating during the hub and blades lowering operation,
5. means to attach said movable portion to said shaft extension, and
6. means to cause said movable portion so connected to said shaft extension to move in the opposite direction and remove said shaft extension from said drive shaft.

53. A helicopter according to claim 52 and including arm members connected to and projecting outwardly from said frame portion, means supported by said arm members and adapted to be connected to the helicopter rotor blades so as to restrain the blades in fixed relation with respect to the hub.

54. A helicopter according to claim 53 wherein said means adapted to be connected to said blades are connected to said arm members through a ball joint connection.

55. A helicopter according to claim 54 wherein said means to connect said frame portion to the rotor hub constitutes a plurality of bolts adapted to extend through the frame portion and the rotor hub so as to connect the two.

56. A helicopter according to claim 55 wherein said means to cause said movable portion of the tool to move relative to the fixed portion of the tool is a power piston-cylinder mechanism.

57. A helicopter according to claim 56 wherein said means to connect the helicopter rotor blades to the hub are constructed to be detachable from the arm members when the helicopter hub and blades are in their lowered position enveloping the drive shaft and to then be connected to the conventional helicopter pitch control system.

58. A helicopter according to claim 57 wherein said frame portion includes access holes to permit access to the rotor interior portions during the rotor moving operation.

59. A helicopter according to claim 58 wherein said rotor moving means is shaped so that its fixed portion is piloted in the drive shaft member and so that its movable portion is piloted on the rotor hub.

60. A helicopter according to claim 59 wherein said torsional restraint means comprises cooperating tongue and groove members extending between said frame portion and said extension shaft member.

61. A helicopter according to claim 60 wherein said torsional restrain means comprise one or more antitorque rods adapted to be anchored to the fuselage and extend through said frame portion and the hub or hub connected parts.

62. A helicopter according to claim 61 wherein said means to connect said frame portion to rotor hub constitute one or more cable members hanging from the frame member and adapted to be connected to and support the rotor hub therefrom.

63. A helicopter according to claim 62 wherein said means to cause said movable portion of the tool to move relative to the fixed portion of the tool is a jack-screw mechanism.

64. A helicopter according to claim 63 wherein said rotor moving means is shaped so that its fixed portion is piloted in the drive shaft member and so that its movable portion is piloted from the rotor hub.

65. A helicopter according to claim 51 and including means operatively connected to said pressure plate members and said split cone members so as to pull said cones out of engagement with their mating surfaces when the pressure plate member is withdrawn.

66. A helicopter according to claim 46 and including frictionless means to concentrically guide the motion of the hub over the extension shaft and of the extension shaft over the drive shaft during the hub lowering and the extension shaft removal operation.

67. The method of retracting a helicopter rotor main rotor with blades attached thereto from an extended position to a retracted position wherein the helicopter is initially connected to an extension shaft extending substantially vertically from and drivingly connected to the main rotor drive shaft including the steps of:

A. disconnecting the rotor hub from the extension shaft while supporting it in its elevated position, B. controllably lowering the rotor hub with the blades so attached thereto from its extended position to a position enveloping the rotor drive shaft so that the rotor does not rotate about the shafts during the rotor lowering procedure, and C. connecting the rotor hub so lowered to the rotor drive shaft.

68. The method according to claim 67 and including the additional step of connecting the rotor blades to the helicopter after the rotor is lowered to control pitch change motion thereof.

69. The method according to claim 68 and including the additional step of folding the blades with respect to the rotor hub.

70. The method according to claim 67 and including the additional step of removing the extension shaft after rotor lowering before connecting the rotor hub to the drive shaft.

* * * * *

UNITED STATES PATENT OFFICE
CERTIFICATE OF CORRECTION

PATENT NO. : 3,972,491
DATED : August 3, 1976
INVENTOR(S) : Donald Leroy Ferris
Robert Charles Rybicki It is certified that error appears in the above-identified patent and that said Letters Patent are hereby corrected as shown below:

| | |
|---|---|
| Column 6, line 45 | Delete "when" and insert --When-- |
| Column 11, line 25 | Delete "sescond" and insert --second-- |
| Column 14, line 54 | Delete "the steps of disconnecting" |
| Column 14, line 55 | Delete "the helicopter rotor from" |
| Column 16, line 64 | Delete "40" and insert --48-- |

Signed and Sealed this

Twenty-third Day of November 1976

[SEAL]

Attest:

RUTH C. MASON
Attesting Officer

C. MARSHALL DANN
Commissioner of Patents and Trademarks